Figure 1:
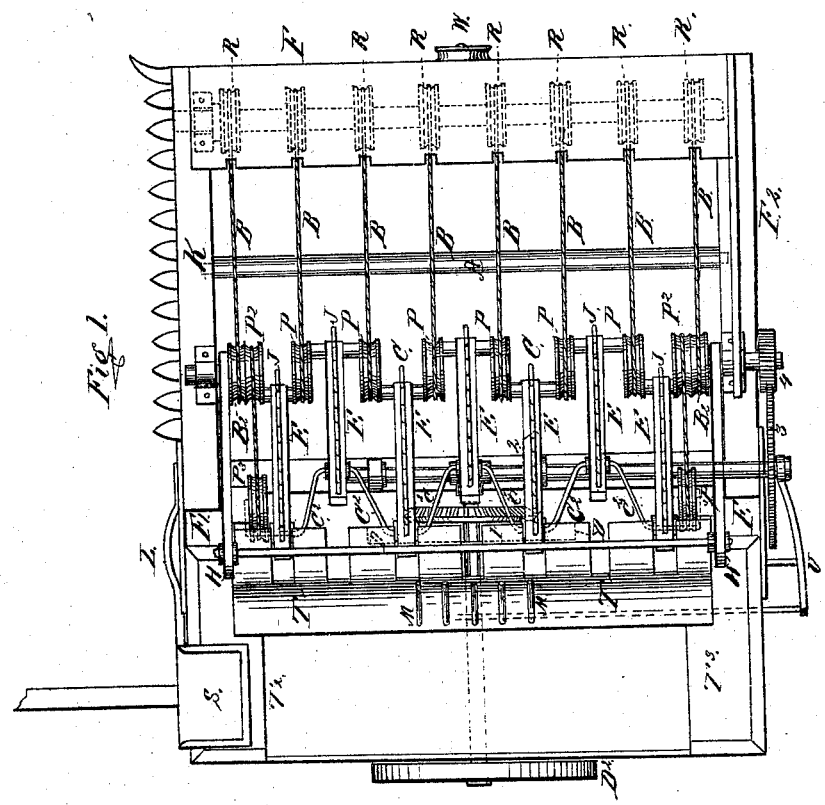

2 Sheets--Sheet 1.

G. W. LEISHER.
Harvesters.

No. 139,900. Patented June 17, 1873.

Witnesses:
E. W. Sweeny
W. A. Murray

Inventor:
G. W. Leisher.

2 Sheets--Sheet 2.
G. W. LEISHER.
Harvesters.
No. 139,900. Patented June 17, 1873.
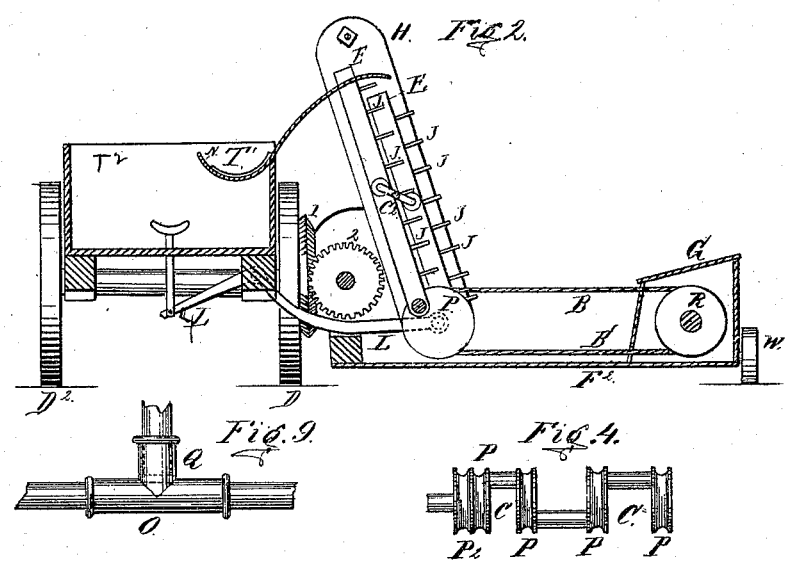
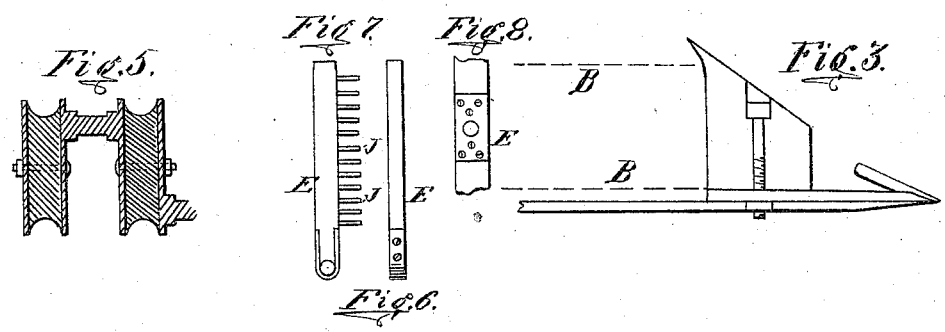
Witnesses:
E. W. Sweeny
W. A. Murray
Inventor:
G. W. Leisher

UNITED STATES PATENT OFFICE.

GEORGE W. LEISHER, OF NEW WILMINGTON, ASSIGNOR OF ONE-HALF HIS RIGHT TO BARTON A. LEISHER, OF RENOVO, PENNSYLVANIA.

IMPROVEMENT IN HARVESTERS.

Specification forming part of Letters Patent No. 139,900, dated June 17, 1873; application filed June 24, 1871.

*To all whom it may concern:*

Be it known that I, GEORGE W. LEISHER, of New Wilmington, in the county of Lawrence and State of Pennsylvania, have invented certain Improvements in Harvester-Platforms, of which the following is a specification:

My invention relates to the combination of endless horizontal bands, moving laterally across the grain-platform of a harvester, and pronged bars or elevators, moved by double cranks in such a manner that the grain as it is cut, falling upon the bands, may be carried by the bands and elevators to a trough or proper receptacle, from which it can be taken and bound by men stationed on the machine; the construction also being such as to allow the grain-platform, with the elevators, to be readily detached from the gearing-frame, and such, also, as to prevent all loss of grain and entanglement of straw.

Figure 1 is a horizontal plan of machine embodying my invention. Fig. 2 is a side elevation of the same, and Figs. 3 to 9 inclusive, are detail sectional views.

B B are endless bands, moving horizontally and laterally over the platform on the pulleys R R and P P, supported, if necessary, by other rollers, A A. The pulleys P P are formed in connection with the crank C C. E E are the elevators, consisting of bars, with straight prongs projecting from their upper faces, said prongs being of such a length, and at such a distance apart as to correspond to the diameter of the pulleys P P. The bands B B and the elevators E E alternate, and are in number sufficient to carry the grain readily. The cranks C C and $C_2$ $C_2$, carrying the elevators E E, are so constructed that an opposite but exactly parallel motion is given to alternate bars, the cranks being connected by the bands $B_2$ moving on the pulleys $P_2$ $P_3$. The posts H H, which carry the upper crank are hinged below on the axis of the lower crank C C, so as to allow the elevator-frame to be turned over on the platform when not in use. When in use, however, the posts H H are secured to the binders' platform, (which is attached to the gearing-frame,) and the ends are connected by a rod. $T_1$ is the receiving-trough or receptacle for the grain, and is attached to the binders' platform. The trough $T_1$ is furnished on the upper edge, next to the elevator-frame, with curved projections or clearers, for the purpose of lifting the grain from the upper prongs of the elevators, and allowing it to fall into the trough $T_1$. $T_2$ and $T_3$ are tables used in binding. The requisite motion is given to the crank C C, and through it to the other parts by suitable gearing connected with the driving-wheel D $D_2$, and applied at the end of the axis of the crank in the rear of the platform.

The grain when cut, falls upon the bands B B, which carry it laterally across the platform to the elevators E E. These, by their prongs, lift it up until it reaches the clearers, which remove it and allow it to fall into the receiving-trough $T_1$. The binders, stationed on the binders' platform, take, each in turn, a gavel from the trough $T_1$, and transferring it to one of the tables $T_2$ or $T_3$, complete the operation of binding, and cast off the sheaf from the machine.

Suitable covering for the bottom of the platform and the under side of the elevator-frame, together with the proper inclosure of the binders' platform, will prevent all loss of grain; while the manner in which the grain is carried up and delivered into the receiving-trough, will prevent entanglement of the straw.

It is evident, also, that the construction allows the platform to be detached from the gearing-frame, and that this improvement may be applied to most harvesters in use.

I make no claim to endless bands, pulleys, cranks, elevators, or other parts, when used separately, or for purposes different from those herein described; but

I claim as my invention—

1. The elevating apparatus, hinged on the axis of the double crank C C, consisting of the frame H H, the pronged elevators E E, the cranks C C and $C_2$ $C_2$, the pulleys $P_2$ and $P_3$, with their bands $B_2$, and the clearer, with its prongs attached to the receiving-trough $T_1$, constructed substantially as herein described, for the purpose of elevating grain from the bands B B running across the platform of a harvester to the receiving-trough $T_1$.

2. The combination of bands B B, double cranks C C and $C_2$ $C_2$, pulleys R R and P P, pronged elevators E E, receiving-trough $T_1$, and tables $T_2$ and $T_3$, in connection with the cutting apparatus and gearing-frame of a harvester, constructed substantially as described, and used for the purpose of allowing grain, as it is cut, to be bound on the machine, and of preventing all loss of grain.

GEORGE W. LEISHER.

Witnesses:
   JOHN KLINE,
   W. A. MURRAY.